United States Patent
Takahashi

(10) Patent No.: US 11,182,343 B2
(45) Date of Patent: Nov. 23, 2021

(54) FILE MANAGEMENT DEVICE AND FILE MANAGEMENT METHOD AND NON-TRANSITORY COMPUTER READABLE MEDIUM

(71) Applicant: PFU Limited, Ishikawa (JP)

(72) Inventor: Akifumi Takahashi, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 206 days.

(21) Appl. No.: 16/210,946

(22) Filed: Dec. 5, 2018

(65) Prior Publication Data

US 2020/0065294 A1 Feb. 27, 2020

(30) Foreign Application Priority Data

Aug. 23, 2018 (JP) ............................. JP2018-156247

(51) Int. Cl.
| | |
|---|---|
| *G06F 16/00* | (2019.01) |
| *G06F 16/16* | (2019.01) |
| *G06K 9/62* | (2006.01) |
| *H04N 1/32* | (2006.01) |
| *G06F 16/11* | (2019.01) |

(52) U.S. Cl.
CPC .......... *G06F 16/166* (2019.01); *G06F 16/122* (2019.01); *G06K 9/6201* (2013.01); *H04N 1/32475* (2013.01)

(58) Field of Classification Search
None
See application file for complete search history.

(56) References Cited

U.S. PATENT DOCUMENTS

| | | |
|---|---|---|
| 2005/0063009 A1 | 3/2005 | Ehara et al. |
| 2006/0050302 A1 | 3/2006 | Sawaguchi |
| 2008/0151330 A1* | 6/2008 | Takahata ............ H04N 1/00352 358/497 |
| 2015/0261775 A1 | 9/2015 | Shin et al. |

(Continued)

FOREIGN PATENT DOCUMENTS

| | | |
|---|---|---|
| JP | 2005-056315 A | 3/2005 |
| JP | 2005-346627 A | 12/2005 |

(Continued)

OTHER PUBLICATIONS

Notice of Reasons for Refusal received in corresponding Japanese Patent Application No. 2018-156247, dated Oct. 1, 2021 w/Machine English Translation.

*Primary Examiner* — Bai D Vu
(74) *Attorney, Agent, or Firm* — McDermott Will & Emery LLP

(57) ABSTRACT

There is provided a file management device includes: a memory; and a processor coupled to the memory and the processor configured to determine a naming rule for a file name to be assigned to an electronic file for a document, based on a format of the document; and determine the file name by using a character string included in the electronic file in accordance with the determined naming rule. The processor is further configured to store, with respect to an existing electronic file, naming rules relating to documents having a common format, in association with the format; and select, for an electronic file for a newly input document, a naming rule to be applied, from among the stored naming rules, based on a format of the electronic file.

11 Claims, 13 Drawing Sheets

(56) References Cited

U.S. PATENT DOCUMENTS

| | | |
|---|---|---|
| 2018/0218208 A1 | 8/2018 | Arakawa |
| 2018/0349414 A1* | 12/2018 | Morita ................ G06F 16/5846 |
| 2019/0065451 A1* | 2/2019 | Miyamoto ............ G06F 40/166 |

FOREIGN PATENT DOCUMENTS

| | | |
|---|---|---|
| JP | 2006-072892 A | 3/2006 |
| JP | 2009-205325 A | 9/2009 |
| JP | 2016-018454 A | 2/2016 |
| JP | 2018-124656 A | 8/2018 |

* cited by examiner

File management device 20

The rule creation process (S10)

FIG. 6A

| Divided character string |
|---|
| 20180103 |
| — |
| L.A.N Co., Ltd. |
| — |
| Invoice |

Divided character string

FIG. 6B

| Divided character string | Meaning |
|---|---|
| 20180103 | Date |
|  | Symbol |
| L.A.N Co., Ltd. | Company name |
|  | Symbol |
| Invoice | Document name |

The result of specifying the meaning of the divided character string

FIG. 6C

| Character string in the document file | Character string used in the file name | Stored data supplementary information |
|---|---|---|
| Your Invoice | Invoice | Deletes "Your" |
| L.A.N Co., Ltd. | L.A.N | Deletes "Co., Ltd." |
| To: PFU Co., Ltd. | PFU | Deletes "To:" Deletes "Co., Ltd." |

Delete character information

FIG. 6D

| Divided character string | Meaning | Coordinates |
|---|---|---|
| 20180103 | Date | (564, 531), ... |
| _ | Symbol | (no coordinates) |
| L.A.N Co., Ltd. | Company name | (302, 711), ... |
| _ | Symbol | (no coordinates) |
| Invoice | Document name | (387, 239), ... |

The result of specifying the position information of
the divided character string

FIG. 6E

| Meaning | Coordinates | Value |
|---|---|---|
| Date | (564, 531), ... | yyyyMMdd |
| Symbol | None | _ |
| Company name | (302, 711), ... | |
| Symbol | None | _ |
| Document name | (387, 239), ... | |

The created naming rule

FIG. 8

```xml
<?xml version="1.0" encoding="utf-8"?>
<FileNamingRule  xmlns:xsi=http://www.w3.org/2001/XMLSchema-instance
xmlns:xsd="http://www.w3.org/2001/XMLSchema">
  <Format>%Date1%_%CompanyName%_%Document%</Format>
  <Components>
    <Component>
      <Name>%Date1%</Name>
      <Type>Date</Type>
      <Position>
        <RectTop>381</RectTop>
        <RectBottom>425</RectBottom>
        <RectLeft>1625</RectLeft>
        <RectRight>2113</RectRight>
      </Position>
      <Ignores />
    </Component>
    <Component>
      <Name>_</Name>
      <Type>Symbol</Type>
      <Ignores />
    </Component>
    <Component>
      <Name>%CompanyName%</Name>
      <Type>CompanyName</Type>
      <Position>
        <RectTop>779</RectTop>
        <RectBottom>824</RectBottom>
        <RectLeft>352</RectLeft>
        <RectRight>894</RectRight>
      </Position>
    </Component>
    <Component>
      <Name>_</Name>
      <Type>Symbol</Type>
      <Ignores />
    </Component>
    <Component>
      <Name>%Document%</Name>
      <Type>Document</Type>
      <Position>
        <RectTop>577</RectTop>
        <RectBottom>628</RectBottom>
        <RectLeft>809</RectLeft>
        <RectRight>1665</RectRight>
      </Position>
    </Component>
  </Components>
  <DPI>300</DPI>
  <ruleCount>1</ruleCount>
</FileNamingRule>
```

A file name assigning process (S20)

FIG. 10A

| Meaning | Coordinates | Value |
|---|---|---|
| Date | (564, 531), ... | yyyyMMdd |
| Symbol | None | |
| Company name | (302, 711), ... | |
| Symbol | None | |
| Document name | (387, 239), ... | |

The selected naming rules

FIG. 10B

| Rule | The value of the same position |
|---|---|
| Date | November 4, 2017 |
| Company name | HugeHuge Co., Ltd. |
| Document name | Estimate |

The result of character string extraction when the format is identical

FIG. 10C

| Rule | The value of the same meaning |
|---|---|
| Date | 2001/1/3 |
| Company name | L. A. N Co., Ltd. |
| Document name | Estimate |

The result of character string extraction when the format is not identical

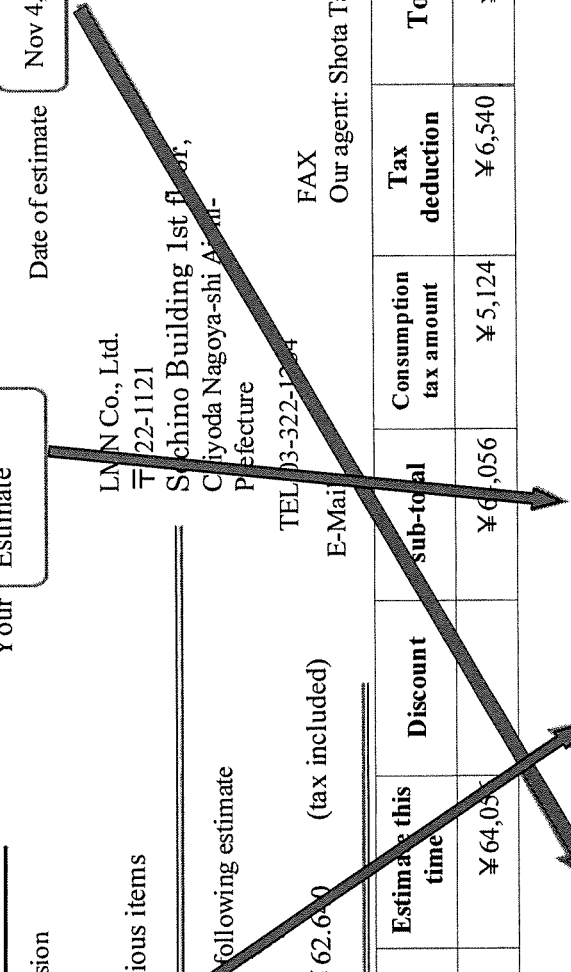

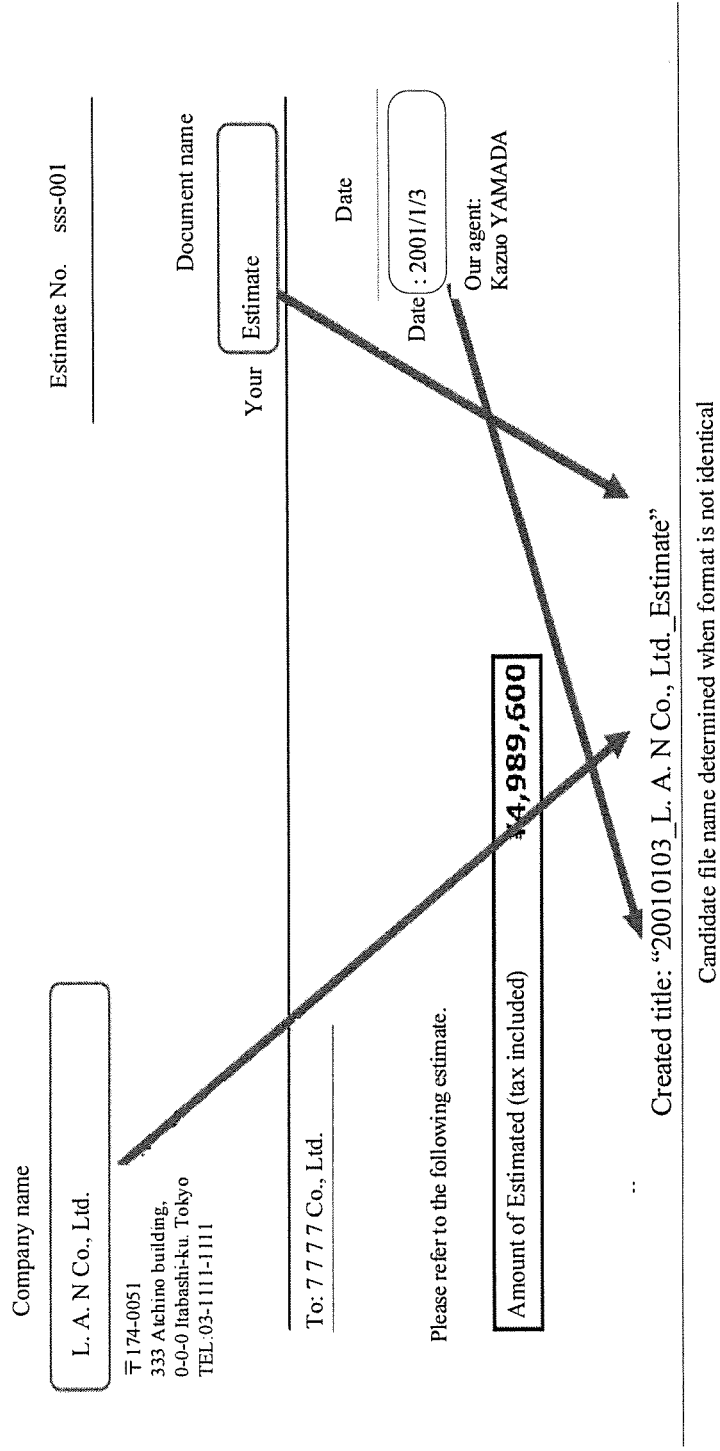

FILE MANAGEMENT DEVICE AND FILE MANAGEMENT METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-156247 filed Aug. 23, 2018.

FIELD

The present invention relates to a file management device, a file management method, and a non-transitory computer readable medium.

SUMMARY OF THE INVENTION

According to an aspect of the invention, there is provided a file management device comprising: a memory and a processor coupled to the memory configured to: determine a naming rule for a file name to be assigned to an electronic file for a document, based on a format of the document; and determine the file name by using a character string included in the electronic file in accordance with the determined naming rule.

According to another aspect of the invention, there is provided a file management method comprising the steps of: determining a naming rule for a file name to be assigned to an electronic file for a document, based on a format of the document; and determining the file name by using a character string included in the electronic file in accordance with the determined naming rule.

According to another aspect of the invention, there is provided a non-transitory computer readable recording medium storing thereon a computer program that causes a computer to perform a method comprising: determining a naming rule for a file name to be assigned to an electronic file for a document, based on a format of the document; and determining the file name by using a character string included in the electronic file in accordance with the determined naming rule.

BRIEF DESCRIPTION OF THE DRAWINGS

Exemplary embodiments of the present invention will be described in detail based on the following figures.

FIG. 6A-FIG. 6E are flowcharts illustrating a process for creating a naming rule in the rule creation process.

FIG. 8 is a view exemplifying a naming rule registered on the rule DB 380.

FIG. 10A-FIG. 10C are views exemplifying a naming rule and a character string extraction result in the file name assigning process.

FIG. 11A and FIG. 11B are views exemplifying candidate file names created based on the naming rule.

DESCRIPTION OF EMBODIMENTS

Figure 1:
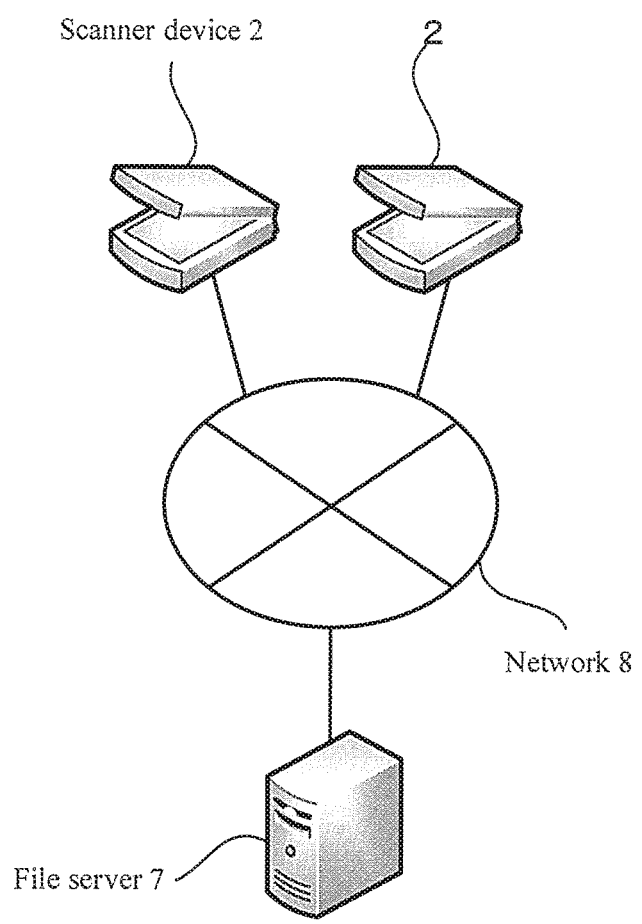
FIG. 1 is a view exemplifying an overall configuration for a file management system 1.

FIG. 1 is a view exemplifying an overall configuration for a file management system 1.

As exemplified in FIG. 1, the file management system 1 includes a scanner device 2 and a file server 7, and these components are connected to each other via a network 8.

The scanner device 2 is an image reading device configured to read an image of a document to create an electronic file for the document. The scanner device 2 also incorporates a file management device 20 (described later) configured to process the electronic file (document file) of the read document. It is noted that in the present example, a case where the file management device 20 is incorporated in the scanner device 2 will be described as a specific example, but the present invention is not limited thereto and can apply to a computer device in which the file management device 20 separates from the scanner device 2.

The file server 7 is a computer terminal configured to store the document file created by the scanner device 2. For example, a plurality of folders (storage areas for document files) are provided in the file server 7, and are assigned to a plurality of users and a plurality of tasks. It is noted that in the present example, a case where a document file is stored in the file server 7 will be described as a specific example, but the present invention is not limited thereto. For example, the document file may be stored in a computer terminal (client terminal) of each user.

The network 8 is a network communication line through which document files are transmitted and received, and is, for example, a local area network (LAN) or an Internet network.

Figure 2:
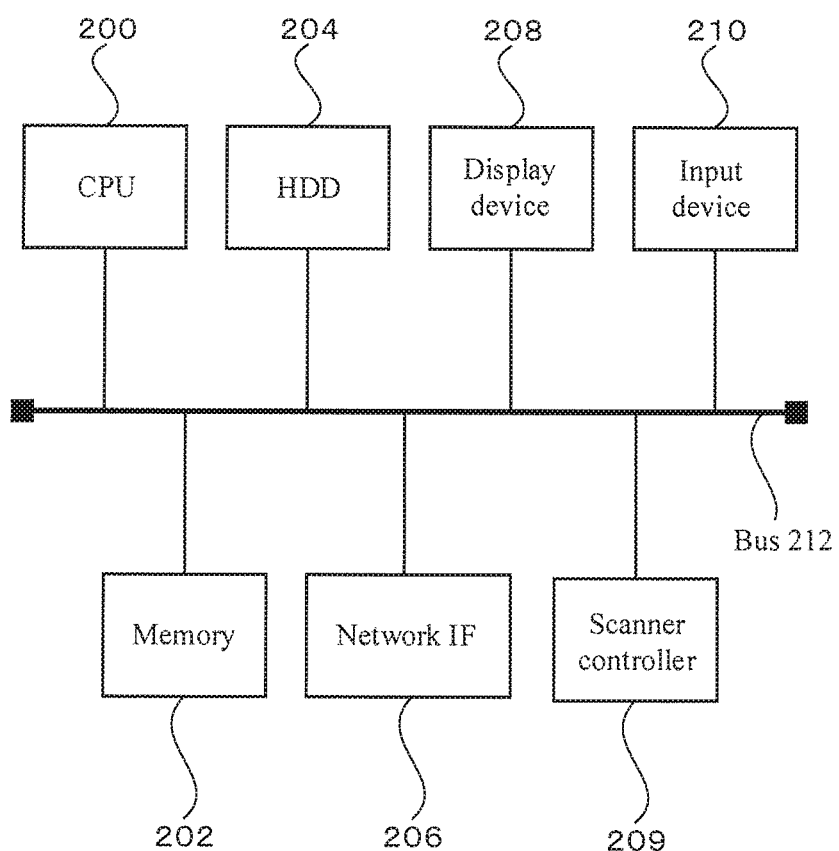
FIG. 2 is a view exemplifying a hardware configuration of the file management device 20 incorporated in the scanner device 2.

FIG. 2 is a view exemplifying a hardware configuration of the file management device 20 incorporated in the scanner device 2.

As exemplified in FIG. 2, the file management device 20 includes a CPU 200, a memory 202, an HDD 204, a network interface 206 (network IF 206), a display device 208, a scanner controller 209, and an input device 210. These components are connected, via a bus 212, to one another.

The CPU 200 is a central processing unit, for example.

The memory 202 is a volatile memory, for example, and functions as a main storage device.

The HDD 204 is a hard disk drive device, for example, and serves as a non-volatile recording device to store computer programs (such as a file management program 3 in FIG. 3) and other data files.

The network IF 206 is an interface for communication by cable or radio.

The display device 208 is a liquid crystal display, for example.

The scanner controller 209 is a control device configured to control a scanning operation of the scanner device 2.

The input device 210 is a keyboard or a mouse, for example.

Figure 3:
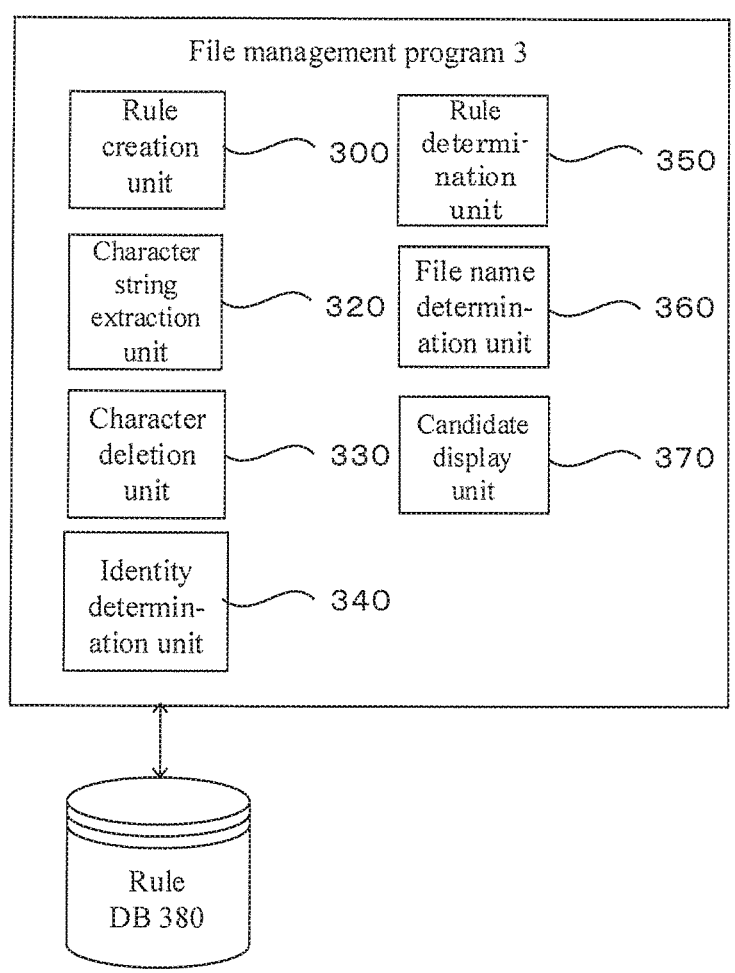
FIG. 3 is a view exemplifying a functional configuration for the file management device 20.

FIG. 3 is a view exemplifying a functional configuration for the file management device 20.

As exemplified in FIG. 3, the file management program 3 is installed in the file management device 20, in which a rule database 380 (rule DB 380) is configured. The file management program 3 is stored in a recording medium such as a CD-ROM, and installed in the file management device 20 via the recording medium.

It is noted that the file management program 3 may be partially or completely implemented by hardware such as an ASIC, or may be implemented by partially utilizing the function of an OS (Operating System). All of these programs may be installed in one computer terminal or may be installed in a virtual machine on a cloud.

The file management program 3 includes a rule creation unit 300, a character string extraction unit 320, a character deletion unit 330, an identity determination unit 340, a rule determination unit 350, a file name determination unit 360, and a candidate display unit 370.

In the file management program 3, the rule creation unit 300 creates, based on an existing electronic file to which a file name has been assigned, a naming rule that includes meaning specifying information for specifying the meaning of a character string constituting the file name, and position information for defining the position of the character string in a document. The meaning specifying information is information for specifying the meaning of a character string. The meaning specifying information may be information for specifying only a character type such as Kanji, alphabet, or numeral, or may be information for specifying a more specific meaning such as a document name, a date, or a company name. The position information is information for defining the position of the character string in the document, and is, for example, the coordinates of the start position or the center position of the character string.

The character string extraction unit 320 extracts a character string from a document file. The character string extraction unit 320 in the present example performs OCR processing on the document file read by the scanner device 2 to extract a character string.

The character deletion unit 330 deletes one or some characters from a character string extracted by the character string extraction unit 320 in accordance with a predetermined deletion rule. The character deletion unit 330 in the present example deletes one or some characters from a character string extracted by the character string extraction unit 320 in accordance with a deletion rule created by a deletion rule creation unit 310 (described later).

The identity determination unit 340 compares combinations of character strings in documents and compares positions of the character strings in the documents, to determine identity in format. More specifically, the identity determination unit 340 compares a newly input document file with an existing document file in the same folder as that of the newly input document file to determine identity in format based on whether a character string having the same meaning is present at the same position in the documents. The identity determination unit 340 in the present example compares a character string in the document in which one or some characters are deleted by the character deletion unit 330 with the meaning specifying information and the position information of a naming rule associated with the same folder. If the number of identifies is equal to or larger than a reference value, the identity determination unit 340 determines that their formats are identical.

The rule determination unit 350 selects, for the newly input document file, a naming rule to be applied from among naming rules stored in the rule DB 380 based on the determination result of the identity determination unit 340. The rule determination unit 350 in the present example selects a naming rule corresponding to the format determined to be identical by the identity determination unit 340 from among the naming rules in the same folder stored in the rule DB 380.

The file name determination unit 360 determines a file name by using a character string included in the document file in accordance with the naming rule determined by the rule determination unit 350. For example, if a plurality of naming rules are selected by the rule determination unit 350, the file name determination unit 360 determines a plurality of file names as candidate file names by using character strings included in the document file. With respect to the naming rules selected by the rule determination unit 350 (namely, naming rules corresponding to an identical format), the file name determination unit 360 in the present example arranges character strings included in the document file in accordance with these naming rules to create a candidate file name. With respect to the naming rules not selected by the rule determination unit 350 (namely, naming rules corresponding to a non-identical format), the file name determination unit 360 arranges character strings included in the document file in accordance with only the meaning specifying information of the naming rules to create a candidate file name.

The candidate display unit 370 displays the file names determined by the file name determination unit 360 as candidates, and assigns a selected file name to the document file in accordance with a selection operation by a user. For example, the candidate display unit 370 determines the display order of the candidate file names according to an application frequency or an application date and time of each of the selected naming rules. The candidate display unit 370 in the present example gives priority to the file names determined according to the naming rules corresponding to the identical format over the file names determined according to the naming rules corresponding to the non-identical format, and arranges and displays the file names in descending order of application frequency of the naming rules.

Figure 4:
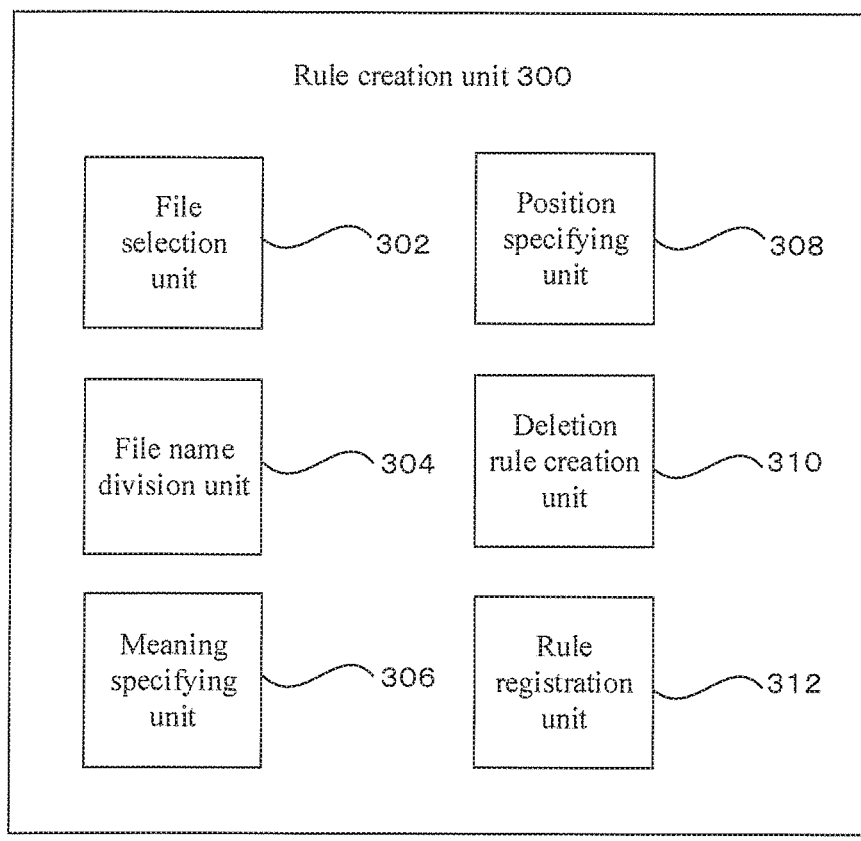
FIG. 4 is a view exemplifying a functional configuration of the rule creation unit 300.

FIG. 4 is a view exemplifying a functional configuration of the rule creation unit 300.

As exemplified in FIG. 4, the rule creation unit 300 includes a file selection unit 302, a file name division unit 304, a meaning specifying unit 306, a position specifying unit 308, a deletion rule creation unit 310, and a rule registration unit 312.

The file selection unit 302 selects a document file being a source of a naming rule to be additionally registered. For example, the file selection unit 302 selects a document file whose file name has been changed by the user.

The file name division unit 304 divides the file name of the document file selected by the file selection unit 302 into a plurality of parts. For example, the file name division unit 304 divides the file name of the document file selected by the file selection unit 302 at positions of a predetermined division symbol (underscore "_" in the present example).

The meaning specifying unit 306 specifies the meaning of each of the parts divided by the file name division unit 304, and creates meaning specifying information corresponding to the specified meaning. For example, the meaning specifying unit 306 determines which of a date, a company name, and a document name corresponds to each of the parts divided by the file name division unit 304 to create meaning specifying information for specifying the result of the determination.

The position specifying unit 308 searches the document file for the character string of each part of the file name divided by the file name division unit 304 to specify the position of the character string of each part in the document, and creates position information indicating the specified position. For example, the position specifying unit 308 sets the coordinates of each part of the file name in the document as position information.

The deletion rule creation unit 310 compares the character string of each part of the file name divided by the file name division unit 304 with character strings in the document file, determines a deletion rule for partially deleting the character string when the character string is a part of the file name, and creates the determined deletion rule information.

The rule registration unit 312 associates the meaning specifying information created by the meaning specifying unit 306 with the position information created by the position specifying unit 308 to create a naming rule. The rule registration unit 312 also associates the naming rule with the deletion rule information created by the deletion rule creation unit 310, and registers the resulting information on the rule DB 380. The rule registration unit 312 in the present example registers both the naming rule including the meaning specifying information and the position information, and the deletion rule information on the rule DB 380 in association with the folder in which the document file selected by the file selection unit 302 is stored.

With respect to an existing electronic file, the rule DB 380 stores a naming rule for documents having a common format, in association with the format. The rule DB 380 in the present example stores the naming rule and the deletion rule created by the rule creation unit 300. The naming rule in the present example incorporates information on the format of the original document file.

Figure 5:
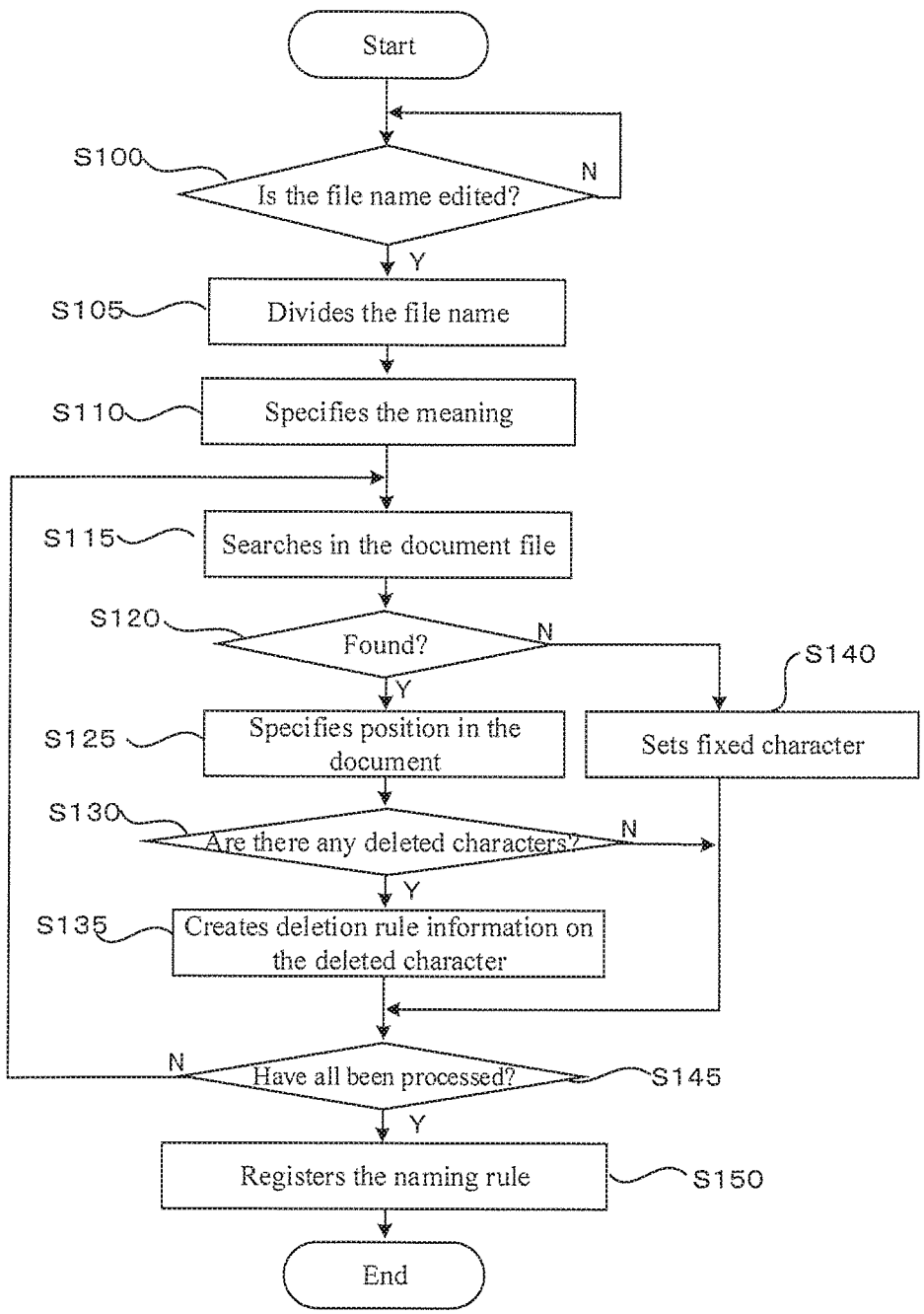
FIG. 5 is a flowchart for describing a rule creation process (S10) performed by the file management device 20.

FIG. 5 is a flowchart for describing a rule creation process (S10) performed by the file management device 20.

Figure 7:
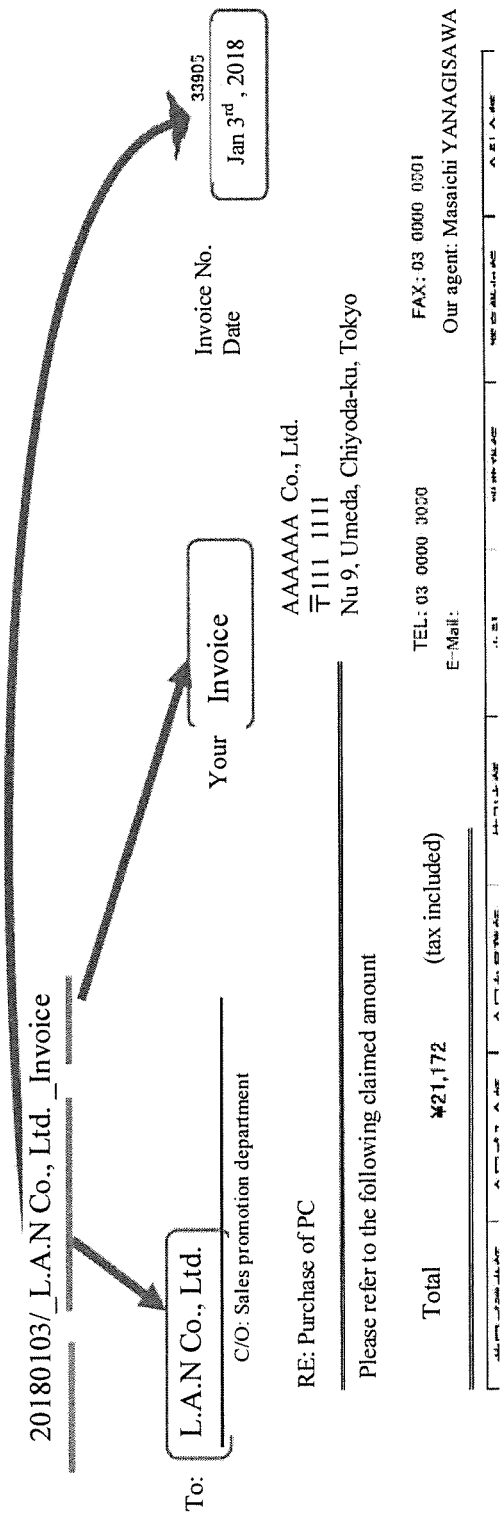
FIG. 7 is a view exemplifying a document being a source of the naming rule.

FIG. 6A-FIG. 6E are illustrating a process for creating a naming rule in the rule creation process, and FIG. 7 is a view exemplifying a document being a source of the naming rule.

As illustrated in FIG. 5, in step 100 (S100), the file selection unit 302 of the file management device 20 waits until the file name of any one of the document files is edited by the user (S100: No), and when the file name of any one of the document files is edited, the file selection unit 302 notifies the file name division unit 304 and the rule registration unit 312 of the edited document file, its file name, and its folder, and shifts to the process of S105.

In step 105 (S105), as illustrated in FIG. 6A, the file name division unit 304 divides the file name notified by the file selection unit 302 with a division symbol "_".

In step 110 (S110), as illustrated in FIG. 6B, the meaning specifying unit 306 specifies the meaning of each part of the file name divided by the file name division unit 304. The meaning to be specified in the present example is a date, a company name, or a document name.

In step 115 (S115), the position specifying unit 308 sequentially searches the document file selected by the file selection unit 302 for each part (the divided character string) of the file name divided by the file name division unit 304.

In step 120 (S120), if the corresponding part (divided character string) of the file name is found in the document file, the rule creation unit 300 shifts to the process of S125; if the corresponding part of the file name is not found in the document file, the rule creation unit 300 shifts to the process of S140.

In step 125 (S125), as illustrated in FIG. 6D, the position specifying unit 308 specifies position information (coordinates) of the corresponding part (divided character string) of the file name in the document, and associates the position information with the divided character string.

In step 130 (S130), the deletion rule creation unit 310 compares the corresponding part (divided character string) of the file name with the part (the part including the divided character string) found in the document file to determine whether there is a deleted character.

If it is determined that there is a deleted character, the rule creation unit 300 shifts to the process of S135; if it is determined that there is no deleted character, the rule creation unit 300 shifts to the process of S145.

In step 135 (S135), as illustrated in FIG. 6C, the deletion rule creation unit 310 creates deletion rule information on the deleted character.

If the corresponding part (divided character string) of the file name is not found in the document, then in step 140 (S140), the position specifying unit 308 sets this part (the divided character string) as a fixed character string part (fixed character).

In step 145 (S145), if all the divided parts of the file name have been processed, the rule creation unit 300 shifts to the process of S150; if there is an unprocessed part, the rule creation unit 300 returns to S115 to process the next part.

In step 150 (S150), as illustrated in FIG. 6E, with respect to the identical part (divided character string), the rule registration unit 312 associates the meaning specified by the meaning specifying unit 306 with the coordinates specified by the position specifying unit 308 to create a naming rule, and also registers the naming rule on the rule DB 380 in association with the folder in which the document file is stored. It is noted that the naming rule in the present example is further associated with a value.

Further, the rule registration unit 312 registers the deletion rule created by the deletion rule creation unit 310 on the rule DB 380.

As described above, with respect to a document file whose file name has been edited by the user, the rule creation unit 300 compares each part of the file name with character strings in the document, as illustrated in FIG. 7, to create a naming rule. As illustrated in FIG. 8, the created naming rule is registered on the rule DB 380 in, for example, XML (Extensible Markup Language) format.

Figure 9:
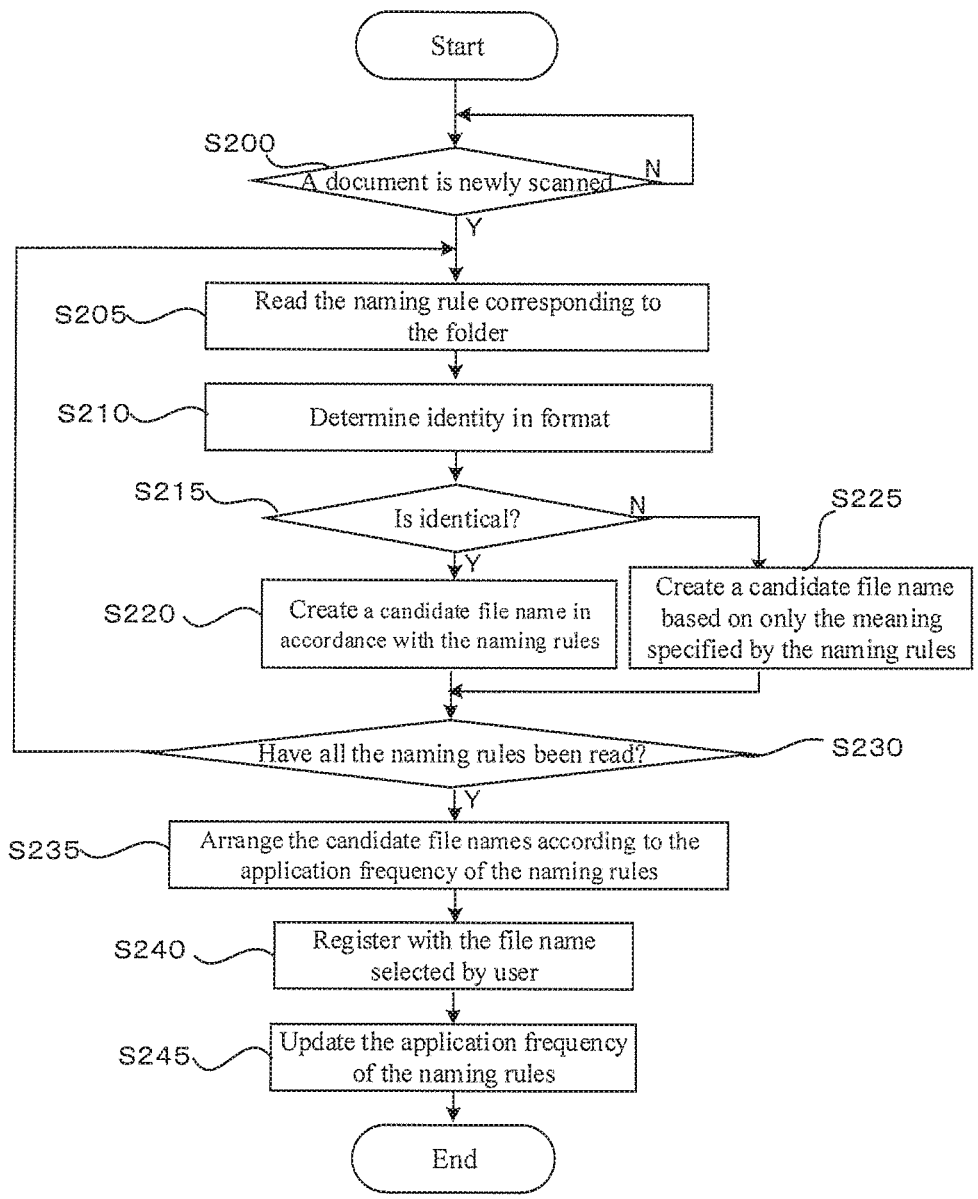
FIG. 9 is a flowchart illustrating a file name assigning process (S20) performed by the file management device 20.

FIG. 9 is a flowchart illustrating a file name assigning process (S20) performed by the file management device 20.

FIG. 10A-FIG. 10C are illustrating a naming rule and a character string extraction result in the file name assigning process, and FIG. 11A and FIG. 11B are views exemplifying candidate file names created based on the naming rule.

As illustrated in FIG. 9, in step 200 (S200), the file management device 20 waits until the scanner device 2 has scanned a document (S200: No), and after the document is scanned and a document file is created, the process proceeds to S205. In the present example, as a condition for scanning the document, a place (folder) to store a created document file is designated.

In step 205 (S205), the rule determination unit 350 (FIG. 3) of the file management program 3 specifies, from the rule DB 380, a folder to store the created document file, and sequentially reads, from the rule DB 380, the naming rule and the deletion rule associated with the specified folder.

In step 210 (S210), the identity determination unit 340 determines identity in format with respect to the naming rule read by the rule determination unit 350. In the present example, based on the naming rule illustrated in FIG. 10A, the identity determination unit 340 determines whether there is a character string having the meaning specified based on the meaning specifying information (meaning) at the position in the document indicated by the position information (coordinates), to evaluate the identity in format.

In step 215 (S215), if the identity determination unit 340 determines that the format is identical, the file management program 3 shifts to the process of S220; if the identity determination unit 340 determines that the format is not identical, the file management program 3 shifts to the process of S225.

In step 220 (S220), as illustrated in FIG. 10B, the character string extraction unit 320 extracts a plurality of character strings from the document file in accordance with the naming rule (FIG. 10A) read by the rule determination unit 350. The character deletion unit 330 deletes a part of the extracted character string in accordance with the deletion rule read by the rule determination unit 350.

The file name determination unit 360 combines the plurality of extracted character strings and a division symbol to determine a candidate file name illustrated in FIG. 11A.

In step 225 (S225), the character string extraction unit 320 ignores the position information (coordinates) of the naming rule (FIG. 10A) read by the rule determination unit 350, and extracts a character string having the meaning specified based on the meaning specifying information from the document file. The file name determination unit 360 combines the plurality of extracted character strings and a division symbols to determine a candidate file name illustrated in FIG. 11B.

In step 230 (S230), the file management program 3 determines whether all the naming rules associated with the folder by the rule determination unit 350 have been read. If there is a naming rule that has not been read, the file management program 3 returns to the process of S205 to read the next naming rule; if there is no naming rule that has not been read, the file management program 3 shifts to the process of S235.

In step 235 (S235), the candidate display unit 370 arranges the candidate file name created in S220 at a higher rank than the candidate file name created in S225. If there are a plurality of candidate file names created in S220 or there are a plurality of candidate file names created in S225, the candidate display unit 370 arranges the candidate file names in descending order of the application frequency of the naming rules, and displays the candidate file names on the display device 208.

In step 240 (S240), when one of the displayed candidate file names is selected by the user, the candidate display unit 370 assigns the file name selected by the user to the scanned document file to be stored in the file server 7.

In step 245 (S245), the candidate display unit 370 increments the application count of the naming rule applied with the file name selected by the user by one.

As described above, the file management program 3 presents a plurality of determined candidate file names to the user in such a manner that: with respect to a naming rule corresponding to a format determined to be identical from among the naming rules registered on the rule DB 380, a candidate file name is determined in accordance with the naming rule; with respect to a naming rule corresponding to a format determined to be not identical, a candidate file name is determined in accordance with a part (meaning) of the naming rule.

As described above, with respect to a document file created by scanning a document, the scanner device 2 according to the present embodiment selects a naming rule based on identity in format, and determines a file name in accordance with the selected naming rule. As a result, with respect to the same type of documents, their candidate file names are determined in accordance with the same naming rule, and it is thus possible to assign a file name depending on the document type.

Further, the scanner device 2 in the present example additionally registers a naming rule automatically based on a document file whose file name has been edited by the user. This eliminates a troublesome task of registering a naming rule. Furthermore, the arrangement of candidate file names according to the application frequency of a naming rule makes it possible to preferentially display a candidate file name suitable for the user's preference even when the number of naming rules is enormous due to the automatic registration.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A file management device comprising:
   a memory; and
   a processor coupled to the memory and the processor configured to:
   determine a naming rule for a file name to be assigned to an electronic file for a document, based on a format of the document; and
   determine the file name by using a character string included in the electronic file in accordance with the determined naming rule,
   wherein the processor is further configured to:
   store, with respect to an existing electronic file, naming rules relating to documents having a common format, in association with the format; and
   select, for an electronic file for a newly input document, a naming rule to be applied, from among the stored naming rules, based on a format of the electronic file,
   wherein the processor is further configured to:
   compare combinations of character strings in documents and compare positions of the character strings in the documents, to determine identity in format; and
   select a naming rule to be applied, based on the determination result of the identity in format, and
   wherein the processor is further configured to:
   select a plurality of naming rules, based on the determination result of the identity in format;
   determine a plurality of file names in accordance with each of the selected plurality of naming rules; and
   display the determined plurality of file names as candidate file names.

2. The file management device according to claim 1, wherein the processor further configured to determine a display order of the candidate file names according to an application frequency or an application date and time of each of the selected naming rules.

3. The file management device according to claim 1, wherein the naming rule includes meaning specifying information for specifying a meaning of a character string to be used in the file name, wherein the processor is further configured to:
  extract a character string having the meaning specified based on the meaning specifying information from the document, and
  arrange the extracted character string to create a candidate file name.

4. The file management device according to claim 1, wherein the processor is further configured to:
  create, based on an existing electronic file to which a file name has been assigned, a naming rule that includes meaning specifying information for specifying a meaning of a character string constituting the file name, and position information for defining a position of the character string in a document; and
  store the created naming rule.

5. A file management device comprising:
  a memory; and
  a processor coupled to the memory and the processor configured to:
  determine a naming rule for a file name to be assigned to an electronic file for a document, based on a format of the document; and
  determine the file name by using a character string included in the electronic file in accordance with the determined naming rule,
  wherein the processor is further configured to:
    store, with respect to an existing electronic file, naming rules relating to documents having a common format, in association with the format; and
    select, for an electronic file for a newly input document, a naming rule to be applied, from among the stored naming rules, based on a format of the electronic file,
  wherein the processor is further configured to:
    compare combinations of character strings in documents and compare positions of the character strings in the documents, to determine identity in format; and
    select a naming rule to be applied, based on the determination result of the identity in format, and
  wherein the processor further configured to:
    extract a character string from the electronic file for the document;
    delete one or some characters from the extracted character string in accordance with a predetermined deletion rule; and
    determine the identity based on the character string in which the one or some characters are deleted.

6. The file management device according to claim 5, wherein the naming rule includes meaning specifying information for specifying a meaning of a character string to be used in the file name,
wherein the processor is further configured to:
  extract a character string having the meaning specified based on the meaning specifying information from the document, and
  arrange the extracted character string to create a candidate file name.

7. The file management device according to claim 5, wherein the processor is further configured to:
  create, based on an existing electronic file to which a file name has been assigned, a naming rule that includes meaning specifying information for specifying a meaning of a character string constituting the file name, and position information for defining a position of the character string in a document; and
  store the created naming rule.

8. A file management method comprising:
  determining a naming rule for a file name to be assigned to an electronic file for a document, based on a format of the document; and determining the file name by using a character string included in the electronic file in accordance with the determined naming rule;
  storing, with respect to an existing electronic file, naming rules relating to documents having a common format, in association with the format; and selecting, for an electronic file for a newly input document, a naming rule to be applied, from among the stored naming rules, based on a format of the electronic file;
  comparing combinations of character strings in documents and compare positions of the character strings in the documents, to determine identity in format; and selecting a naming rule to be applied, based on the determination result of the identity in format; and
  selecting a plurality of naming rules, based on the determination result of the identity in format; determine a plurality of file names in accordance with each of the selected plurality of naming rules; and display the determined plurality of file names as candidate file names.

9. A non-transitory computer-readable recording medium storing thereon a computer program that causes a computer to perform a method comprising:
  determining a naming rule for a file name to be assigned to an electronic file for a document, based on a format of the document; and determining the file name by using a character string included in the electronic file in accordance with the determined naming rule;
  storing, with respect to an existing electronic file, naming rules relating to documents having a common format, in association with the format; and selecting, for an electronic file for a newly input document, a naming rule to be applied, from among the stored naming rules, based on a format of the electronic file;
  comparing combinations of character strings in documents and compare positions of the character strings in the documents, to determine identity in format; and selecting a naming rule to be applied, based on the determination result of the identity in format; and
  selecting a plurality of naming rules, based on the determination result of the identity in format; determine a plurality of file names in accordance with each of the selected plurality of naming rules; and display the determined plurality of file names as candidate file names.

10. A file management method comprising:
  determining a naming rule for a file name to be assigned to an electronic file for a document, based on a format of the document; and determining the file name by using a character string included in the electronic file in accordance with the determined naming rule;
  storing, with respect to an existing electronic file, naming rules relating to documents having a common format, in association with the format; and selecting, for an electronic file for a newly input document, a naming rule to be applied, from among the stored naming rules, based on a format of the electronic file;
  comparing combinations of character strings in documents and compare positions of the character strings in the documents, to determine identity in format; and selecting a naming rule to be applied, based on the determination result of the identity in format; and
  extracting a character string from the electronic file for the document; deleting one or some characters from the extracted character string in accordance with a predetermined deletion rule; and determining the identity based on the character string in which the one or some characters are deleted.

11. A non-transitory computer-readable recording medium storing thereon a computer program that causes a computer to perform a method comprising:

determining a naming rule for a file name to be assigned to an electronic file for a document, based on a format of the document; and determining the file name by using a character string included in the electronic file in accordance with the determined naming rule;

storing, with respect to an existing electronic file, naming rules relating to documents having a common format, in association with the format; and selecting, for an electronic file for a newly input document, a naming rule to be applied, from among the stored naming rules, based on a format of the electronic file;

comparing combinations of character strings in documents and compare positions of the character strings in the documents, to determine identity in format; and selecting a naming rule to be applied, based on the determination result of the identity in format; and extracting a character string from the electronic file for the document; deleting one or some characters from the extracted character string in accordance with a predetermined deletion rule; and determining the identity based on the character string in which the one or some characters are deleted.

* * * * *